No. 702,760. Patented June 17, 1902.
H. S. AMWAKE.
ELECTROCHEMICAL GENERATOR.
(Application filed Mar. 13, 1902.)
(No Model.)
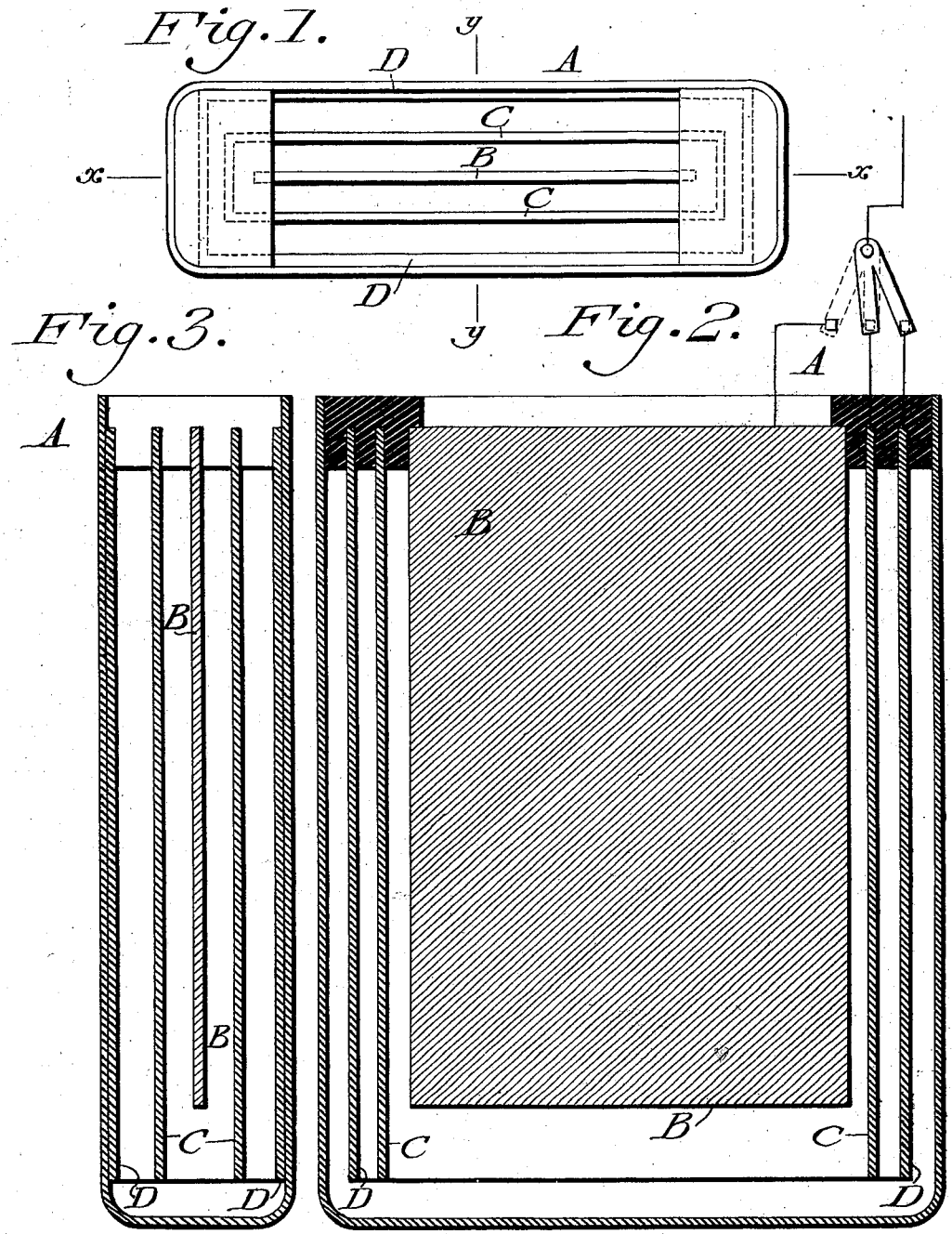
Witnesses
P. F. Nagle.
L. Douville.
Inventor
Harry S. Amwake
By Dwiedersheim & Fairbank
Attorneys
THE NORRIS PETERS CO., PHOTO-LITHO., WASHINGTON, D. C.

UNITED STATES PATENT OFFICE.

HARRY S. AMWAKE, OF CAMDEN, NEW JERSEY, ASSIGNOR TO CHARLES H. GRAHAM AND GEORGE D. BOUTON, OF PHILADELPHIA, PENNSYLVANIA.

ELECTROCHEMICAL GENERATOR.

SPECIFICATION forming part of Letters Patent No. 702,760, dated June 17, 1902.

Application filed March 13, 1902. Serial No. 98,078. (No model.)

*To all whom it may concern:*

Be it known that I, HARRY S. AMWAKE, a citizen of the United States, residing in the city and county of Camden, State of New Jersey, have invented new and useful Improvements in Electrochemical Generators, of which the following is a specification.

My invention relates to electrochemical generators, the object being to place between the positive and negative electrodes in the case a current-conducting baffle which will retard the electrolyte attacking the electrode or electrodes most to be acted upon. I mean placing a baffle or screen, either metallic, semi-metallic, or non-metallic, which shall be made of current-conducting substance or compound, or it may be made of a compound of non-conducting and conducting substances and either of porous or dense structure, and when in position will entirely surround one or more of the electrodes (either positive or negative) of the same sign. The baffle or baffle-partition may be made of carbon or any other material of low resistance. I shall use the baffle, screen, or modifier in position, so that the fluid or electrolyte shall be controlled in some way to prevent the chemical-reducing action from exceeding the rate at which the current is given from the generator. The baffle, screen, or modifier may be constructed either as a good conductor or a bad one; but as I shall use it in my generator it will always be a better conductor of the electric current than the electrolyte.

In this generator, although the baffle is used to prevent a too-rapid circulation of electrolyte about the electrodes most to be acted upon, I shall on occasions when greater current-flow is desired make use of it to perform the function of a part of one electrode of the generator by one of the many electromechanical means.

With the baffle, screen, or modifier being a conducting-partition such as I use I may make its porosity great and its conductance slight, or I may reverse this to porosity slight and conductance great. These factors vary in accordance with the desired output of the generator and life of the electrolyte used.

Preferably I would construct the baffle, screen, or modifier with rough faces. This will increase the constancy of electromotive force of each generator unit.

Broadly considered, my invention consists of a baffle, screen, or modifier (which is a good current-conductor) interposed in the electrolyte between the positive and negative electrodes, by means of which I am enabled to place the baffle, screen, or modifier faces and the electrode faces, both positive and negative, in the closest possible proximity consistent with the proper circulation of the electrolyte required by the flow of electric current discharged from the generator.

Figure 1 represents the top or plan view of an electrochemical generator embodying my invention. Fig. 2 represents the longitudinal vertical section thereof. Fig. 3 represents the transverse vertical section thereof.

Similar letters of reference indicate corresponding parts in the figures.

Referring to the drawings, A designates a case containing a metallic plate B and shells C D of conducting substances. The shell C constitutes a baffle, screen, or modifier and is located around the plate B, and together the shell C and plate B are both located within the shell D, and all are located within the case A. The plate B constitutes a positive electrode. The shell D constitutes a negative electrode. The shell C in normal discharge is disconnected and insulated from either electrode or both electrodes.

A suitable fluid or electrolyte is placed in the case, and it will be seen that owing to the presence of the baffle C the electrolyte in circulation will not pass through it with the current-flow, but will seek devious ways of circulation in order to act only as fast as the current given from the generator demands. Thus the life of the electrolyte is increased and the severity of local action on the metallic plates is decreased. At the same time the electromotive force remains constant.

Where demands for extraordinary discharge of current for short periods of time occur, the baffle C may by different electromechanical devices be put in parallel with either of the electrodes of the generator. By these constructions in the using of an electrolyte composed of sulfuric acid and bichromate of sodium the consumption of the metallic plate, if of zinc, is very small per horse-power of energy delivered.

As the baffle, constructed of a current-conducting substance, is employed between the positive and negative electrodes, I am enabled to place the surface of the baffle at a very small distance from that of the electrodes, thereby reducing the resistance of the solution between the electrodes. Owing to the structure of the baffle being a good current-conductor, but thin films of electrolyte are required, and the current reaches the negative electrode with a less loss of electromotive force than in passing through an equal thickness of electrolyte should there be no baffle in position. Without the baffle in such a construction great heat at the electrode attacked would be generated and the current-discharge from the generator would be much less than obtained by the construction described. In other words, the internal resistance would be so great that most of the full energy of the generator would be consumed in overcoming the resistance of the electrolyte.

The baffle, screen, or modifier is preferably made of rectangular form, and the ends are farther away from the zinc or positive electrode than the sides of the baffle. The action at the ends or edges of the zinc therefore produces a smaller heating effect than at the sides, because the current-flow per unit of area is less. This causes a difference in the heating effect in the fluid between the positive electrode and the baffle, where the largest areas or surfaces are near to each other, and the fluid that is between the zinc and baffle, where the smallest areas or surfaces are most distant. The circulation of the electrolyte then depends upon the difference between the temperatures. The higher temperature raises the fluid, the lower temperature allowing the fluid to fall again. The flow or circulation carries the new electrolyte into contact with the electrode most to be acted on, and so maintains the difference of temperatures and provides the new electrolyte. Thus both actions help to maintain a high electromotive force, with a consequent large current-flow.

Various changes may be made in the details of construction without departing from the general spirit of my invention, and I do not, therefore, desire to be limited in each case to the same.

Having thus described my invention, what I claim as new, and desire to secure by Letters Patent, is—

1. An electrochemical generator consisting of a single fluid-cell, provided with a positive electrode and a negative fixed electrode, an electrolyte, and a current-conducting baffle-partition in said electrolyte, between said electrodes and normally insulated therefrom.

2. An electrochemical generator, consisting of a positive electrode, a negative fixed electrode, an electrolyte, an electric-current-conducting baffle-partition normally insulated from said electrodes and means for making said baffle-partition part of either of said electrodes to act therewith.

3. An electrochemical generator consisting of a single fluid-cell having positive and negative electrodes and a current-conveyer of high conducting or current-carrying capacity interposed as a modifier, screen or baffle between the positive and negative electrodes and adapted to control the rate of change of position of the electrolyte attacking the electrodes most to be acted upon without interfering with the current-flow between the electrodes in the case.

4. An electrochemical generator consisting of a single fluid-cell provided with a positive electrode and a negative fixed electrode, an electrolyte and a current-conducting baffle-partition in said electrolyte between said electrodes and normally insulated therefrom, providing means for causing a higher temperature of the electrolyte between the largest areas of the baffle-partition and the positive electrode and lower temperature between the smallest areas opposed.

HARRY S. AMWAKE.

Witnesses:
JOHN A. WIEDERSHEIM,
WATSON B. RULON.